(12) United States Patent
Nakanishi

(10) Patent No.: US 11,872,949 B2
(45) Date of Patent: Jan. 16, 2024

(54) VEHICLE AIRBAG APPARATUS

(71) Applicant: SUBARU CORPORATION, Tokyo (JP)

(72) Inventor: Shoichiro Nakanishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/971,809

(22) Filed: Oct. 24, 2022

(65) Prior Publication Data

US 2023/0132711 A1 May 4, 2023

(30) Foreign Application Priority Data

Nov. 2, 2021 (JP) ................................ 2021-179094

(51) Int. Cl.
*B60R 21/216* (2011.01)
*B60R 21/205* (2011.01)

(52) U.S. Cl.
CPC .......... *B60R 21/216* (2013.01); *B60R 21/205* (2013.01)

(58) Field of Classification Search
CPC ................ B60R 21/205; B60R 21/216; B60R 2021/23386; B60R 21/2334
See application file for complete search history.

(56) References Cited

U.S. PATENT DOCUMENTS

| 3,801,126 A | * | 4/1974 | Knight, IV | ........... | B60R 21/276 180/90 |
| 5,087,067 A | * | 2/1992 | Seki | ...................... | B60R 21/205 280/732 |
| 2009/0189376 A1 | * | 7/2009 | Vigeant | ................. | B60R 21/239 280/743.2 |

(Continued)

FOREIGN PATENT DOCUMENTS

| CN | 104071115 A | * | 10/2014 | ........... | B60R 21/201 |
| DE | 102018127213 A1 | * | 4/2020 | | |

(Continued)

OTHER PUBLICATIONS

Balsis, Oct. 2014, CN-104071115-A, Machine Translation of Specification.*

(Continued)

*Primary Examiner* — Paul N Dickson
*Assistant Examiner* — Matthew Joseph Ganci
(74) *Attorney, Agent, or Firm* — MCGINN I.P. LAW GROUP, PLLC

(57) ABSTRACT

A vehicle airbag apparatus includes an airbag, a front lid, and a tether. The airbag is configured to be disposed on a back side of an instrument panel, and configured to be expanded and developed between the instrument panel and a windshield glass so as to be disposed on a front side in a vehicle and in front of a vehicle occupant. The front lid is configured to be disposed on the instrument panel, and configured to be ruptured and opened by the expanded and (Continued)

developed airbag so as to stand on the front side in the vehicle and at a front end of the airbag. The tether is disposed on an outer part of the airbag and couples the front lid and the airbag, and configured to be elongated in a front-rear direction of the vehicle in a state where the airbag is expanded and developed.

20 Claims, 7 Drawing Sheets

(56) References Cited

U.S. PATENT DOCUMENTS

| | | | | |
|---|---|---|---|---|
| 2009/0189378 A1* | 7/2009 | Vigeant | ............... | B60R 21/2338 280/743.2 |
| 2014/0265269 A1* | 9/2014 | Fischer | ................ | B60R 21/201 280/730.1 |
| 2017/0080893 A1* | 3/2017 | Miura | ................... | B60R 21/237 |
| 2017/0210327 A1* | 7/2017 | Abe | ....................... | B60R 21/231 |
| 2018/0037185 A1* | 2/2018 | Minami | ............... | B60R 21/2334 |
| 2020/0062211 A1* | 2/2020 | Deng | .................... | B60R 21/205 |
| 2021/0053525 A1* | 2/2021 | Deutschmann | ....... | B60R 21/216 |
| 2021/0061216 A1* | 3/2021 | Ito | ......................... | B60R 21/205 |
| 2021/0101557 A1* | 4/2021 | Malapati | ............... | B60R 21/205 |

FOREIGN PATENT DOCUMENTS

| | | | |
|---|---|---|---|
| DE | 102019105341 A1 * | 9/2020 | |
| JP | H03-159838 A | 7/1991 | |

OTHER PUBLICATIONS

Girisch, Apr. 2020, DE-102018127213-A1, Machine Translation of Specification.*

Girisch, Sep. 2020, DE-102019105341-A1, Machine Translation of Specification.*

* cited by examiner

VEHICLE AIRBAG APPARATUS

CROSS-REFERENCE TO RELATED APPLICATIONS

The present application claims priority from Japanese Patent Application No. 2021-179094 filed on Nov. 2, 2021, the entire contents of which are hereby incorporated by reference.

BACKGROUND

The disclosure relates to a vehicle airbag apparatus.

A vehicle such as an automobile causes an airbag to be expanded and developed in front of an occupant upon a frontal contact with a contact object of the vehicle to thereby restrain, by the airbag, the upper body of the occupant that moves toward the front and to achieve a protection performance of the occupant accordingly. For example, Japanese Unexamined Patent Application Publication (JP-A) No. H03-159838 discloses an airbag apparatus that detects a build of an occupant on the basis of a factor such as a position of a seat, an inclination angle of a seat back, and a feeding amount of a seatbelt. The airbag apparatus disclosed in JP-A No. H03-159838 changes a timing at which an airbag is to be developed on the basis of the detected build of the occupant, thereby improving the protection performance of the occupant by the airbag.

SUMMARY

An aspect of the disclosure provides a vehicle airbag apparatus to be applied to a vehicle. The vehicle airbag apparatus includes an airbag, a front lid, and a tether. The airbag is configured to be disposed on a back side of an instrument panel of the vehicle. The airbag is configured to be expanded and developed between the instrument panel and a windshield glass of the vehicle in response to a supply of a gas such that the airbag is disposed on a front side in the vehicle and in front of an occupant of the vehicle. The front lid is configured to be disposed on the instrument panel. The front lid is configured to be ruptured and opened by the expanded and developed airbag such that the front li stands on the front side in the vehicle and at a front end of the airbag. The tether is disposed on an outer part of the airbag and couples the front lid and the airbag. The tether is configured to be elongated in a front-rear direction of the vehicle in a state where the airbag is expanded and developed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
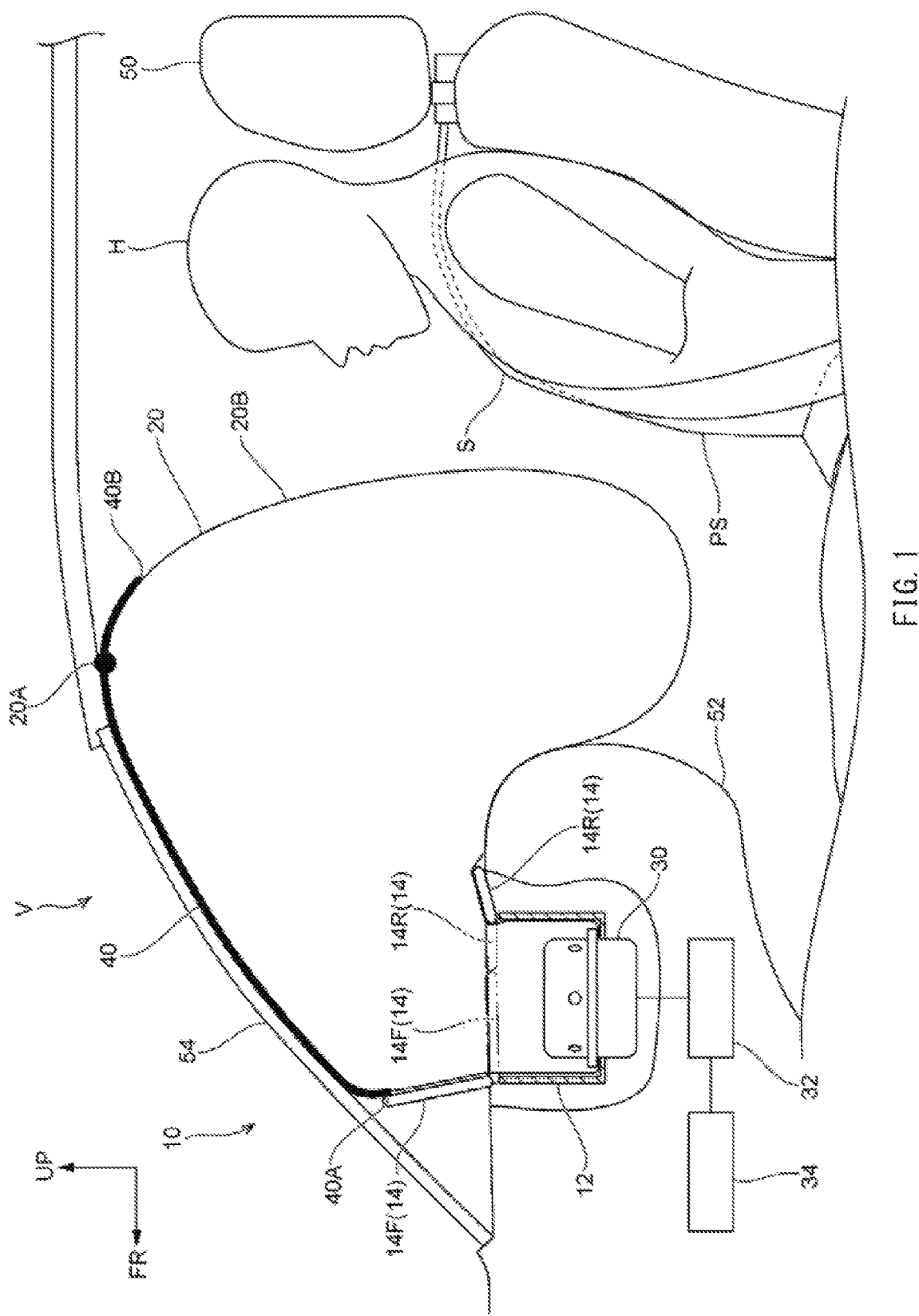
FIG. 1 is a left side diagram illustrating a left part positioned at the front of a cabin of a vehicle to which a vehicle airbag apparatus according to one example embodiment is applied, with an airbag being expanded and developed.

For example, a size of an airbag may be increased from a viewpoint of protecting, by the airbag, any occupant from an occupant of a small build to an occupant of a large build. On the other hand, increasing a size of the airbag can allow the airbag to easily sway in a front-rear direction when an expansion and a development of the airbag are completed, and thereby can make a state in which the airbag is expanded and developed unstable. In addition, the unstableness upon the expansion and the development of the airbag can make it difficult to cause a reaction force of the airbag with respect to the occupant to sufficiently act when the occupant comes into contact with the airbag. In this case, a performance of absorbing a contact energy of the airbag with respect to the occupant can decrease.

It is desirable to provide a vehicle airbag apparatus that makes it possible to improve a contact energy absorbing performance of an airbag while stabilizing an expanded and developed state of the airbag.

In the following, a vehicle airbag apparatus 10 according to some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

It should also be noted that an arrow UP, an arrow FR, and an arrow LH illustrated in the drawings on an as-necessary basis respectively indicate an upper side of a vehicle V, such as an automobile, to which the vehicle airbag apparatus 10 is applied, a front side of the vehicle V, and a left side, or one side in a vehicle-width direction, of the vehicle V. In the following description, the arrow UP, the arrow FR, and the arrow LH respectively indicate an up-down direction, a front-rear direction, and a right-left direction of the vehicle V when the description is given with reference to up and down directions, front and rear directions, and right and left directions, unless otherwise specified in particular.

Figure 2:
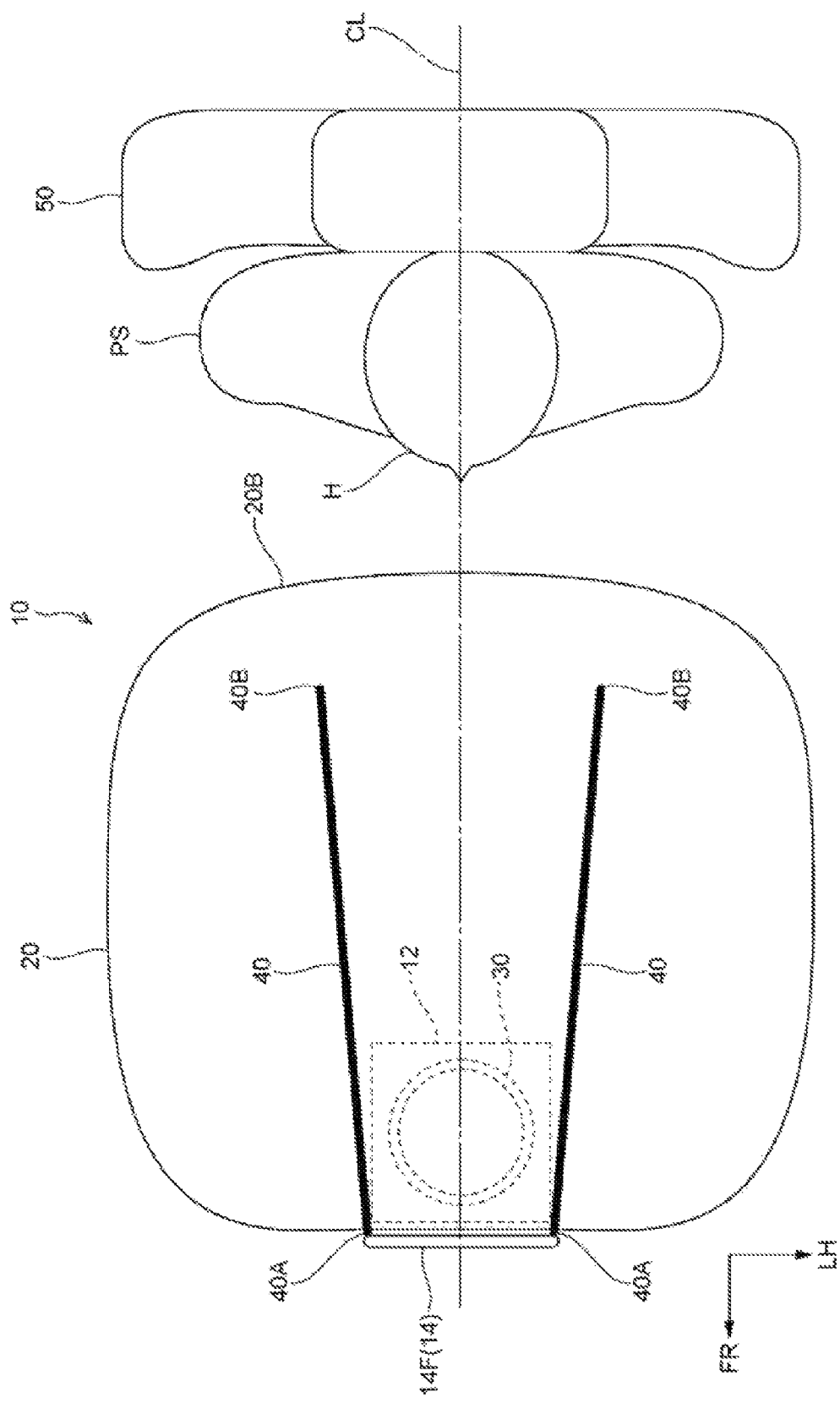
FIG. 2 is a plan diagram illustrating the vehicle airbag apparatus illustrated in FIG. 1 as viewed from the above.

Referring to FIGS. 1 and 2, the vehicle airbag apparatus 10 may be a passenger's seat airbag apparatus that protects a passenger's seat occupant PS as an occupant who is to sit on a passenger's seat 50 disposed at a front part of a cabin of the vehicle V. It should be noted that FIGS. 1 and 2 each illustrate a state in which an airbag 20 of the vehicle airbag apparatus 10 is expanded and developed.

The vehicle airbag apparatus 10 may include a module case 12, the airbag 20, and an inflator 30. The airbag 20 may be stored inside the module case 12 in a folded state. The inflator 30 may eject a gas and supply the gas to the airbag 20. In one embodiment, the inflator 30 may serve as a "gas generator". The vehicle airbag apparatus 10 may also include a lid 14 and a pair of right and left tethers 40. The lid 14 may be set on an instrument panel 52 of the vehicle V, and may cover the module case 12 from an upper side thereof. The tethers 40 may couple the lid 14 and the airbag 20 together. In the following, described is a configuration of the vehicle airbag apparatus 10 according to an example embodiment.

[Module Case 12]

The module case 12 may have a substantially rectangular box shape that is opened upwardly. The module case 12 may be disposed adjacent to a back side (i.e., a lower side) of the instrument panel 52, and may be supported by a framework member of the instrument panel 52, such as an unillustrated instrument panel reinforce. A center line CL in the right-left direction of the module case 12 may be disposed at a position that coincides with a center line in the right-left direction of the passenger's seat occupant PS, as seen in a planar view from the upper side.

[Lid 14]

The lid 14 may be disposed at an upper side of the module case 12 of the instrument panel 52, and may cover the module case 12 from the upper side thereof. The lid 14 may be configured to be ruptured and opened by the airbag 20 in response to an expansion and a development of the airbag 20, and to open the module case 12 toward the upper side. For example, the lid 14 may include a front lid 14F and a rear lid 14R. The front lid 14F may configure a front part of the lid 14. The rear lid 14R may configure a rear part of the lid 14. The front lid 14F and the rear lid 14R each may have a substantially rectangular shape in which the vehicle-width direction corresponds to a longitudinal direction thereof. A center line in the right-left direction of the lid 14 may coincide with the center line CL of the module case 12.

Upon the expansion and the development of the airbag 20, the front lid 14F may open toward the front with a front end of the front lid 14F being a point of origin, and the rear lid 14R may open toward the rear with a rear end of the rear lid 14R being a point of origin. As described later in greater detail, the front lid 14F may be opened at substantially 90 degrees from a state in which the module case 12 is closed and may be configured to be disposed in a standing fashion in a side view as seen in the vehicle-width direction, whereby a tip of the front lid 14F may be disposed close to a lower side of a front end of a windshield glass 54. The rear lid 14R may be opened at substantially 180 degrees from the state in which the module case 12 is closed and may be configured to be interposed between the later-described airbag 20 and the instrument panel 52, whereby the rear lid 14R may be disposed adjacent to an upper side of the instrument panel 52. A back surface (i.e., a lower surface) of the instrument panel 52 at an outer peripheral part of the lid 14 in which the lid 14 is set may have unillustrated notches that allow the front lid 14F and the rear lid 14R to open as a result of the rupture of the notches upon the expansion and the development of the airbag 20.

[Airbag 20]

For example, the airbag 20 may have a bag shape in which outer peripheral parts of a plurality of base fabrics are sewn. The airbag 20 may be expanded and developed from an opening of the module case 12 toward the rear in response to the supply of the gas from the later-described inflator 30, and may be configured to be disposed in front of the passenger's seat occupant PS accordingly. In one example, a middle part in a width direction (in the right-left direction) of the airbag 20 may be configured to be positioned at the front of the passenger's seat occupant PS to restrain, by the airbag 20, the head H and the upper body of the passenger's seat occupant PS that move toward the front upon a frontal contact. The airbag 20 may have a shape that is bilaterally symmetric with respect to the center line CL in a planar view.

A front part of the airbag 20 may be configured to be disposed along the instrument panel 52 and the windshield glass 54 of the vehicle V as seen in a side view, and come into contact with the instrument panel 52 and the windshield glass 54. In addition, a front end of the airbag 20 may be configured to be disposed adjacent to a rear side of the front lid 14F. With this configuration, the airbag 20 may be supported from a front side by the front lid 14F, the instrument panel 52, and the windshield glass 54. It should be noted that a width (i.e., a size in the right-left direction) of the front lid 14F is not particularly limited in an example embodiment. However, the width of the front lid 14F may be changed on an as-necessary basis to secure a performance, by the front lid 14F, of supporting the airbag 20.

An upper end 20A of the airbag 20 may be configured to be disposed at a rear side of the windshield glass 54 and at an upper side of the head H of the passenger's seat occupant PS. A rear surface 20B of the airbag 20 may be inclined to have a substantially curved shape toward the rear as the rear surface 20B goes downward in a side view. In an example embodiment, the passenger's seat occupant PS may be AM50 dummy, which is 50 percentile of U.S. adult males.

[Inflator 30]

The inflator 30 may be provided in the front end of the airbag 20. The inflator 30 may have a hollow and substantially cylindrical shape in which the up-down direction corresponds to an axial direction, and may be fixed to a bottom wall of the module case 12. The inflator 30 may be electrically coupled to an airbag ECU 32. In one embodiment, the airbag ECU 32 may serve as a "processor". Upon activation of the inflator 30 by the airbag ECU 32, the gas ejected from an upper part of the inflator 30 may be supplied inside the airbag 20, causing the airbag 20 to be expanded and developed.

The airbag ECU 32 may be electrically coupled to a contact sensor 34. The airbag ECU 32 may detect or estimate the frontal contact with the vehicle V on the basis of data from the contact sensor 34, and may cause the inflator 30 to activate in a case where the frontal contact is detected or estimated.

[Tether 40]

The pair of tethers 40 may be string-shaped members having flexibility and configured not to expand or contract. The pair of tethers 40 may couple the airbag 20 and the front lid 14F together at an outer part of the airbag 20, and may be disposed inside the module case 12 together with the airbag 20. A length of the tether 40 may be so set that the tether 40 is in an elongated state in the front-rear direction upon completion of the expansion and the development of the airbag 20. As used herein, the elongated state of the tether 40 may refer to a state in which a tensile force in a longitudinal direction is acted on the tether 40 and the tether 40 is thus strained tightly.

The tether 40 may have a front end 40A that is coupled to a corner of the tip of the front lid 14F, allowing the tether 40 to extend toward the rear from the front lid 14F. In one embodiment, the front end 40A may serve as "one end" or a "first end". For example, the tether 40 may be configured to extend from the front lid 14F obliquely upward toward the rear along the windshield glass 54 in a side view. The tether 40 may have a rear end 40B that is coupled to an upper end part of the airbag 20. In one embodiment, the rear end 40B may serve as "the other end" or a "second end". For example, the rear end 40B of the tether 40 may be disposed at an upper side as compared with the front end 40A of the tether 40 in the up-down direction. In one example, the rear end 40B of the tether 40 may be configured to be disposed at an upper side of the head H of the passenger's seat occupant PS and at a rear side as compared with the upper end 20A of the airbag 20. Accordingly, in one embodiment of the disclosure, the wording "the tether is configured to be elongated in the front-rear direction of the vehicle" may encompass an example case where the tether 40 is so elongated as to be disposed in a direction in which the tether 40 is inclined upwardly as the tether 40 goes to the rear.

The tether 40 may be configured to extend substantially in the front-rear direction and interposed between the airbag 20 and the windshield glass 54 in a planar view. For example, the tether 40 may be configured to be sightly inclined toward an outer side in the vehicle-width direction as the tether 40 goes toward the rear in a planar view. The rear end 40B of the tether 40 may be configured to be disposed at an outer side in the vehicle-width direction of the head H of the passenger's seat occupant PS in a planar view. In some embodiments, the tether 40 may be so disposed as to extend in the front-rear direction in a planar view.

Workings and Example Effects

A description is given next of workings and example effects of the vehicle airbag apparatus 10 according to an example embodiment.

In the vehicle airbag apparatus 10 according to an example embodiment described above, the airbag ECU 32 may activate the inflator 30 in a case where the airbag ECU 32 detects or estimates the frontal contact with the vehicle V on the basis of a signal supplied from the contact sensor 34. Thus, the gas ejected from the inflator 30 may be supplied inside the airbag 20. The airbag 20 having been supplied with the gas may rupture and open the front lid 14F and the rear lid 14R set on the instrument panel 52, and may be expanded and developed from the opening of the module case 12 toward the rear. Hence, the airbag 20 may be expanded and developed at the front of the passenger's seat occupant PS.

Upon the frontal contact of the vehicle V, the passenger's seat occupant PS can move forward by an inertial force. For example, owing to attachment of a seatbelt S illustrated in FIG. 1 to the passenger's seat occupant PS, the upper body of the passenger's seat occupant PS may be inclined to the front around the waist of the passenger's seat occupant PS as the center. This helps to receive, by the rear surface 20B of the airbag 20, the head H and the upper body of the passenger's seat occupant PS that move forward and thereby to restrain the head H and the upper body of the passenger's seat occupant PS.

It should be noted that, in the vehicle airbag apparatus 10 according to an example embodiment, the front lid 14F may be ruptured and opened toward the front and so stand as to be disposed adjacent to the front side of the front end of the airbag 20 upon the expansion and the development of the airbag 20. In addition, the outer part of the airbag 20 may be provided with the pair of right and left tethers 40, and the tethers 40 couple the front lid 14F and the airbag 20 together. The tether 40 may be elongated in the front-rear direction in the state in which the airbag 20 is expanded and developed. This configuration helps to stabilize a state of the airbag 20 upon the completion of the expansion and the development of the airbag 20, and to allow a sufficient reaction force to act on the passenger's seat occupant PS from the airbag 20 upon receiving the upper body of the passenger's seat occupant PS by the airbag 20.

Figure 3:
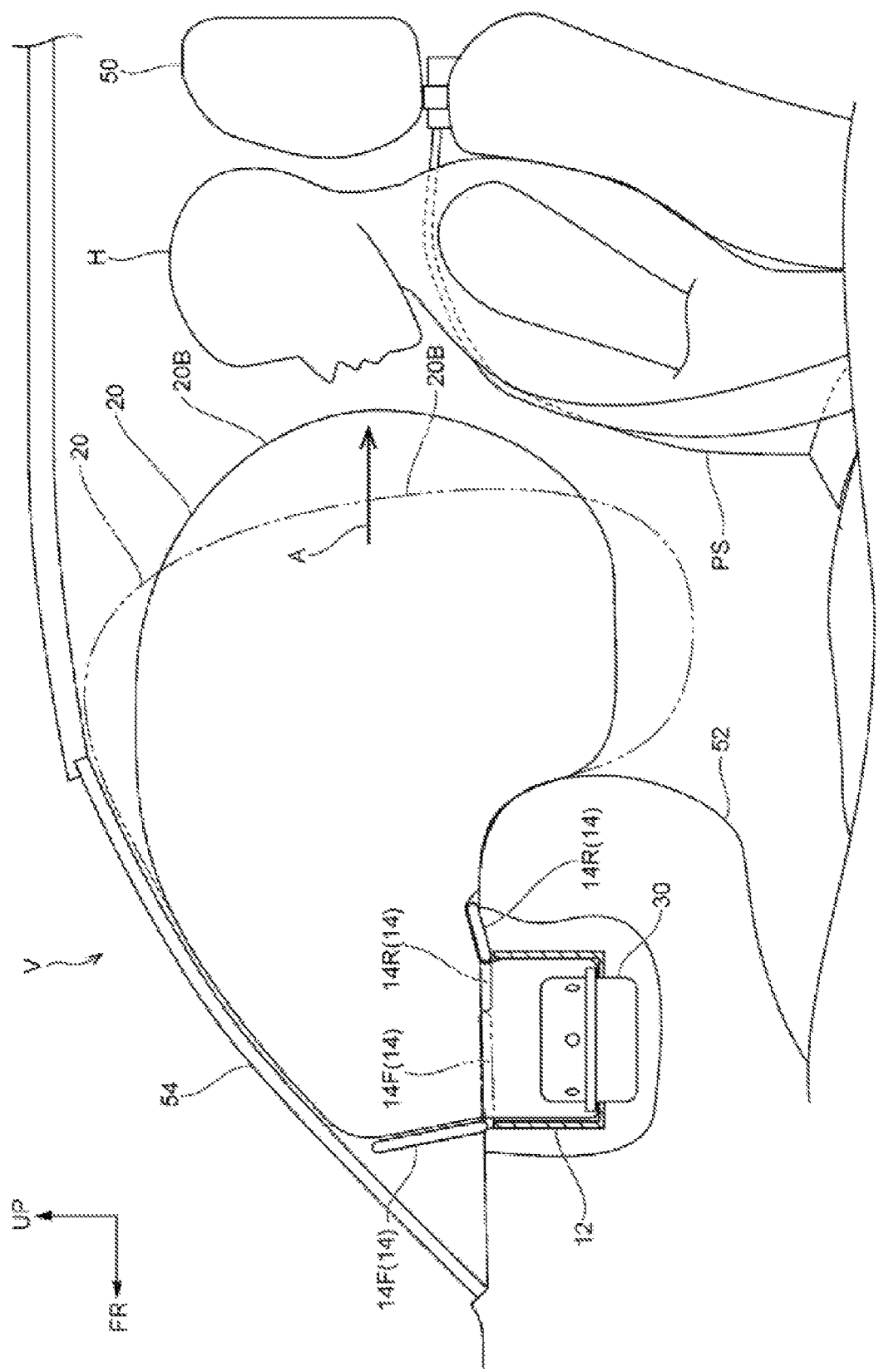
FIG. 3 is a side diagram illustrating a behavior of an airbag of an airbag apparatus according to a comparative example, when an expansion and a development of the airbag are completed.

In the following, the workings and example effects according to an example embodiment described above are described while comparing them with those of an airbag apparatus according to a comparative example. The airbag apparatus according to the comparative example has a similar configuration to the vehicle airbag apparatus 10 according to an example embodiment, with the exception that, in the airbag apparatus according to the comparative example, the tethers 40 are eliminated from the vehicle airbag apparatus 10 according to an example embodiment as illustrated in FIG. 3. In other words, in the airbag apparatus according to the comparative example, the front lid 14F is uncoupled to the airbag 20, and configured to stand at the front of the airbag 20.

The airbag 20 expands and develops from the module case 12 to the rear as a result of the supply of the gas of the inflator 30. Thus, upon the completion of the expansion and the development of the airbag 20, a rear part of the airbag 20 attempts, by an inertial force, to be displaced more on the rear side (i.e., on a side in an arrow A direction in FIG. 3) than a regular position at which the expansion completes (i.e., a position of the airbag 20 indicated by a dashed-two dotted line in FIG. 3). Hence, in the airbag apparatus according to the comparative example, the airbag 20 so deforms that the rear surface 20B of the airbag 20 approaches the passenger's seat occupant PS upon the completion of the expansion and the development of the airbag 20 (see the airbag 20 illustrated by a solid line in FIG. 3), which can allow the airbag 20 to sway in the front-rear direction upon the completion of the expansion and the development of the airbag 20. It should be appreciated that the phenomenon that the airbag 20 sways tend to occur easily in a case where a size of the airbag 20 is increased. Accordingly, in the airbag apparatus according to the comparative example, the state in which the airbag 20 is expanded and developed can become unstable.

Figure 4:
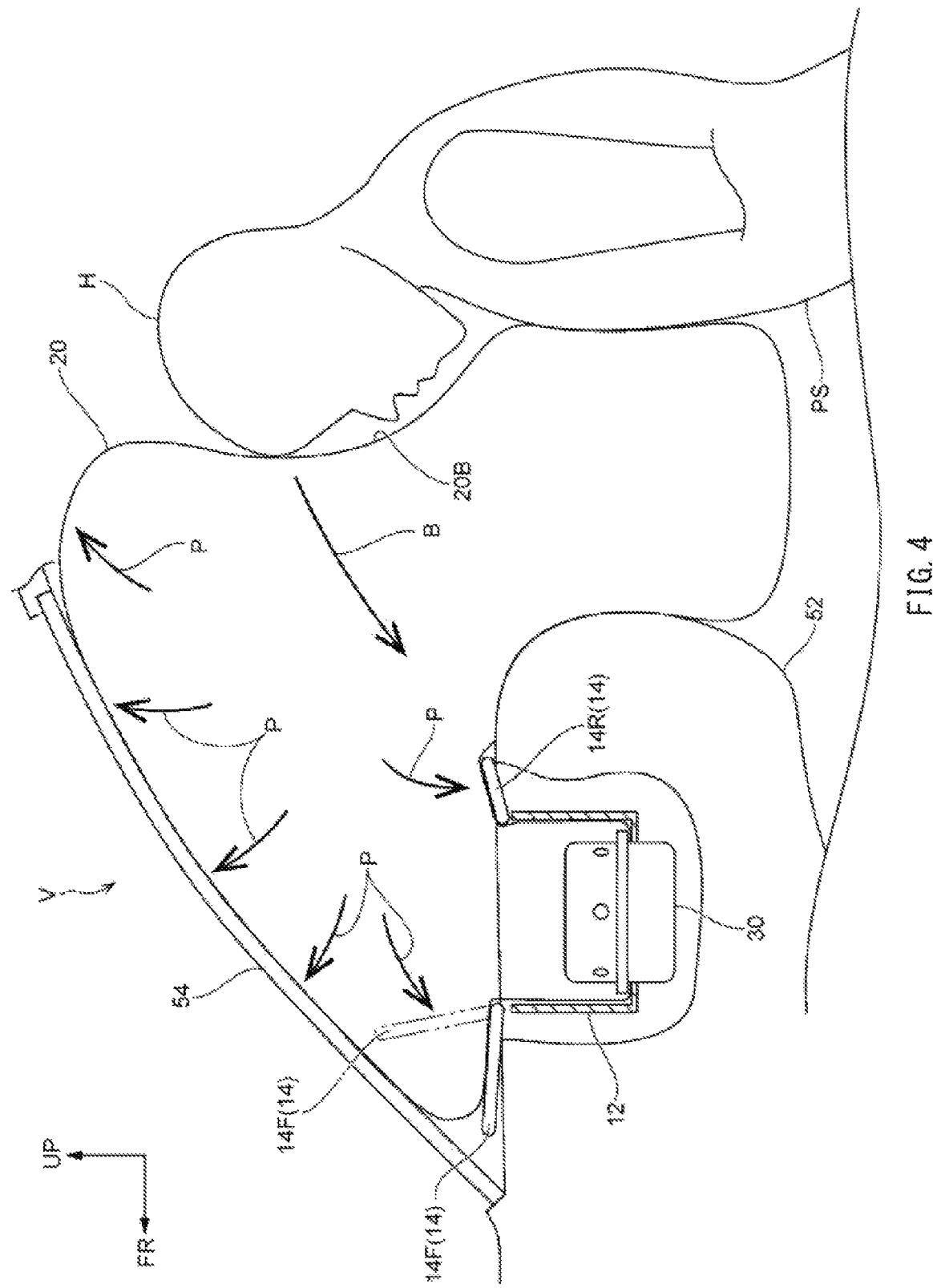
FIG. 4 is a side diagram illustrating a state in which an occupant in a passenger seat who leans forward upon a frontal contact has come into contact with the airbag of the airbag apparatus according to the comparative example illustrated in FIG. 3.

In addition, referring to FIG. 4, the head H and the upper body of the passenger's seat occupant PS move to the front and enter the rear surface 20B of the airbag 20 (see an arrow B in FIG. 4) upon receiving the head H and the upper body of the passenger's seat occupant PS by the airbag 20, causing an internal pressure of the airbag 20 to be increased (see an arrow P of FIG. 4). Hence, in the airbag apparatus according to the comparative example, the front end of the airbag 20 can press the front lid 14F toward the front by the increase in the internal pressure of the airbag 20, which can cause the front lid 14F to tilt forward (see the front lid 14F and the airbag 20 indicated by a solid line in FIG. 4). In this case, the front end of the airbag 20 is displaced toward the front and enters a region between the front end of the windshield glass 54 and the front end of the front lid 14F. Accordingly, the front end of the airbag 20 can escape toward the front, which can cause a decrease in the reaction force that acts on the passenger's seat occupant PS from the airbag 20 and can thereby decrease a performance of absorbing a contact energy of the airbag 20 with respect to the passenger's seat occupant PS.

In contrast, in the vehicle airbag apparatus 10 according to an example embodiment, the pair of right and left tethers 40 may be provided at the outer part of the airbag 20 and may couple the airbag 20 and the front lid 14F together. In addition, the tether 40 may be elongated in the front-rear direction in the state in which the airbag 20 is expanded and developed. Thus, the airbag 20 and the lid 14 may be coupled together by the tether 40 stretched in the longitudinal direction. Hence, it helps to suppress, by the tether 40, the rear end of the airbag 20 from being displaced more on the rear side than the regular position at which the expansion completes, even when the inertial force is acted on the airbag 20 upon the completion of the expansion and the development of the airbag 20. Accordingly, it helps to suppress the airbag 20 from swaying in the front-rear direction after the completion of the expansion and the development of the airbag 20 and to stabilize the state in which the airbag 20 is expanded and developed.

Figure 5:
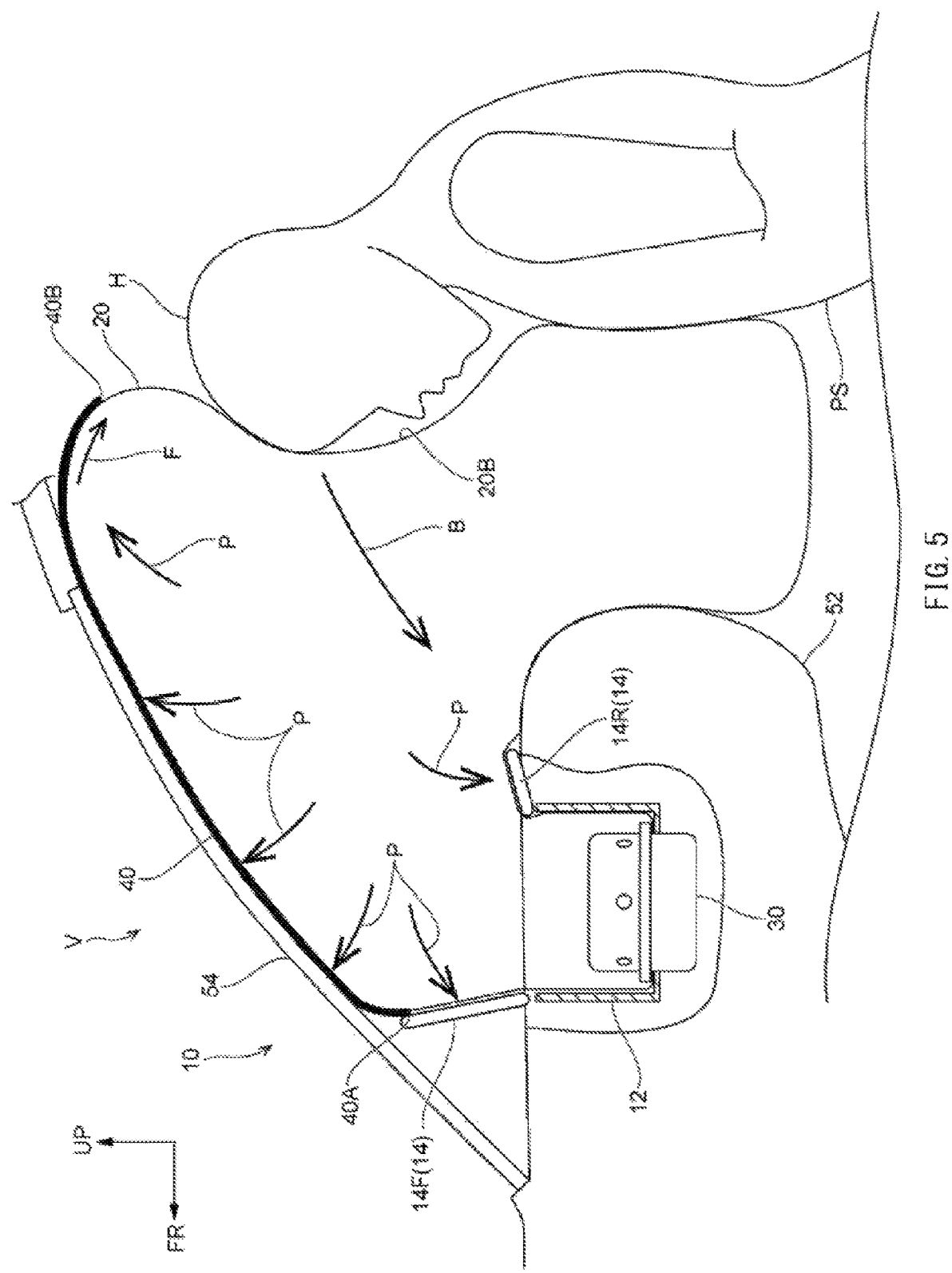
FIG. 5 is a side diagram illustrating a state in which the occupant in the passenger seat who leans forward upon the frontal contact has come into contact with the airbag of the vehicle airbag apparatus according to one example embodiment.

Further, referring to FIG. 5, the internal pressure of the airbag 20 increases and the front end of the airbag 20 may press the front lid 14F toward the front similarly to the above-described manner upon receiving, by the airbag 20, the head H and the upper body of the passenger's seat occupant PS. It should be noted that the airbag 20 and the lid 14 may be coupled together by the tether 40 elongated in the front-rear direction as described above. Thus, it helps to suppress, by the tether 40, the front lid 14F from tilting to the front even when the front end of the airbag 20 presses the front lid 14F toward the front. For example, the tether 40 helps to favorably keeps the state in which the frond lid 14F stands and to favorably keep the state in which the front lid 14F supports the front end of the airbag 20. Hence, it helps to allow the sufficient reaction force to act on the passenger's seat occupant PS from the airbag 20. Accordingly, it helps to improve the contact energy absorbing performance of the airbag 20 with respect to the passenger's seat occupant PS. The vehicle airbag apparatus 10 according to an example embodiment described above helps to improve the contact energy absorbing performance of the airbag 20 with respect to the passenger's seat occupant PS while stabilizing the state in which the expansion and the development of the airbag 20 are completed.

In some embodiments, the elongated tether 40 may be configured to be interposed between the airbag 20 and the windshield glass 54. Thus, the airbag 20 may press the tether 40 toward the windshield glass 54 in response to the increase in the internal pressure of the airbag 20 upon the entry of the head H and the upper body of the passenger's seat occupant PS onto the airbag 20. Accordingly, it helps to favorably keep the state in which the tether 40 is elongated and to favorably keep the state in which the front lid 14F stands.

In some embodiments, the rear end 40B of the tether 40 may be configured to be positioned more on the upper side than the head H of the passenger's seat occupant PS. Thus, it helps to suppress the tether 40 from interfering with the passenger's seat occupant PS when the head H and the upper body of the passenger's seat occupant PS, inclined to the front, have entered the rear surface 20B of the airbag 20 from the rear. For example, it helps to suppress a rear end part of the tether 40 from interfering with the passenger's seat occupant PS.

In some embodiments, the rear end 40B of the tether 40 may be configured to be disposed more on the rear than the upper end 20A of the airbag 20. Thus, it helps to allow the rear end 40B of the tether 40 to be disposed closer to the rear surface 20B of the airbag 20. Hence, it helps to allow the rear end 40B of the tether 40 to be drawn toward the passenger's seat occupant PS when the head H and he upper body of the passenger's seat occupant PS, inclined to the front, have entered the airbag 20 from the rear surface 20B. Accordingly, it helps to allow the airbag 20 to pull the rear end 40B of the tether 40 toward the rear (i.e., on the other side in the longitudinal direction and in a direction of an arrow F in FIG. 5). This in turn helps to more effectively keep the state in which the front lid 14F stands.

In some embodiments, the rear end 40B of the tether 40 may be configured to be disposed on the outer side in the vehicle-width direction of the head H of the passenger's seat occupant PS in a planar view. Thus, it helps to suppress the tether 40 from interfering with the passenger's seat occupant PS when the head H and the upper body of the passenger's seat occupant PS, inclined to the front, have entered the rear surface 20B of the airbag 20 from the rear. For example, it helps to suppress the rear end part of the tether 40 from interfering with the passenger's seat occupant PS.

In some embodiments, the front end 40A of the tether 40 may be coupled to the corner of the tip of the front lid 14F. Thus, it helps to support the tip of the stood front lid 14F by the tether 40. Hence, it helps to stably support the stood front lid 14F as compared with an example case where a middle part in the up-down direction of the stood front lid 14F is supported by the tether 40.

In some embodiments, the pair of tethers 40 may be configured to extend from the corners of the tip of the front lid 14F toward the rear and the rear ends of the respective tethers 40 may be coupled to the airbag 20. Thus, it helps to couple the airbag 20 and the front lid 14F together by the pair of tethers 40 on both sides in the right-left direction with respect to the middle part in the right-left direction of the front lid 14F. Hence, it helps to couple the airbag 20 and the front lid 14F together with good balance in the right-left direction upon the expansion and the development of the airbag 20.

In some embodiments, the lid 14 may include the front lid 14F that configures the front part of the lid 14 and the rear lid 14R that configures the rear part of the lid 14. The front lid 14F and the rear lid 14R may be configured to be ruptured and opened to the front and the rear upon the expansion and the development of the airbag 20. Further, the rear lid 14R may be configured to be interposed between the airbag 20 and the instrument panel 52. Thus, it helps to press the rear lid 14R downward by the airbag 20 in a case where the head H and the upper body of the passenger's seat occupant PS are received by the airbag 20 and the internal pressure of the airbag 20 is thereby increased, which in turn helps to ensure that the rear lid 14R comes into contact with the instrument panel 52. This means that it helps to suppress a gap from being formed between the rear lid 14R and the instrument panel 52 upon restraining the passenger's seat occupant PS by the airbag 20. Hence, it helps to achieve stabilization of the reaction force that acts on the passenger's seat occupant PS upon restraining the passenger's seat occupant PS by the airbag 20.

In an example embodiment described above, the rear end 40B of the tether 40 may be configured to be disposed more on the rear side than the upper end 20A of the airbag 20 and at the upper side of the head H of the passenger's seat occupant PS. However, a position of the rear end 40B of the tether 40 is optional and may be variously modified. In some embodiments, the rear end 40B of the tether 40 may be configured to be disposed more on the front side than the upper end 20A of the airbag 20 and at the upper side of the head H of the passenger's seat occupant PS. Even in this example, it helps to suppress the tether 40 from interfering with the passenger's seat occupant PS when the head H and the upper body of the passenger's seat occupant PS, inclined to the front, have entered the airbag 20 from the rear. In some embodiments, the rear end 40B of the tether 40 may be configured to be disposed more on the front side than the upper end 20A of the airbag 20 and at a lower side of the head H of the passenger's seat occupant PS. Even in this example, it helps to press the tether 40 toward the windshield glass 54 by the airbag 20 in a case where the head H and the upper body of the passenger's seat occupant PS are received by the airbag 20 and the internal pressure of the airbag 20 is thereby increased, which in turn helps to favorably keep the elongated state of the tether 40.

Figure 6:
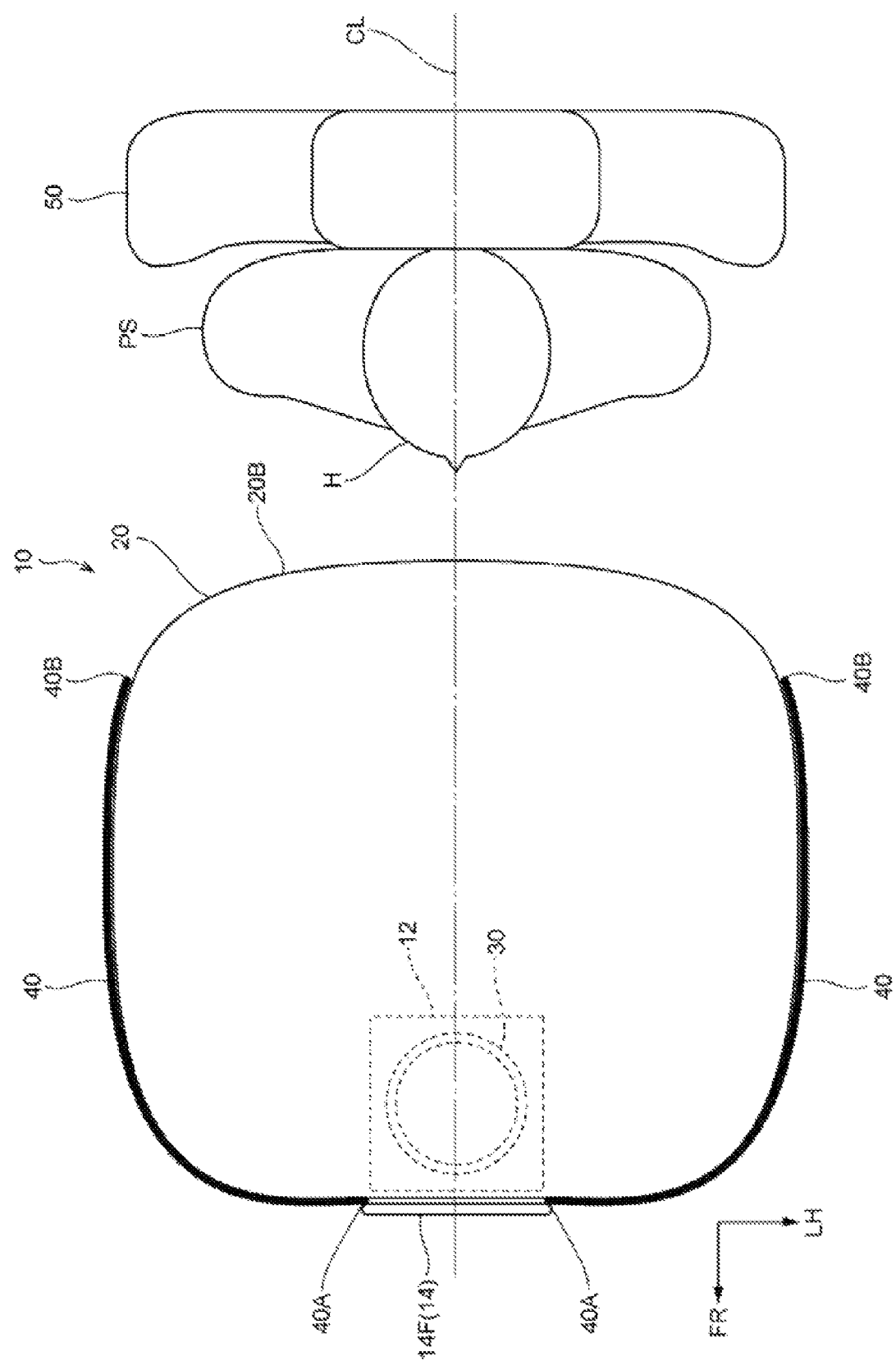
FIG. 6 is a plan diagram illustrating a modification example of a tether of the vehicle airbag apparatus illustrated in FIG. 2.

In an example embodiment described above, the tether 40 may be configured to extend linearly toward the rear from the tip corner of the front lid 14F in a planar view. However, an extending direction of the tether 40 is not limited thereto. In some embodiments, referring to FIG. 6, the tether 40 may be configured to extend toward the rear along a side surface of the airbag 20 from the tip corner of the front lid 14F. Thus, it helps to suppress, with good balance, the displacement toward the rear of the airbag 20 by the pair of right and left tethers 40 upon the completion of the expansion and the development of the airbag 20. Further, in this example, the rear end 40B of the tether 40 may be configured to be disposed at an outer peripheral part of the rear surface 20B of the airbag 20. Thus, it helps to draw the rear ends 40B of the respective tethers 40 toward a middle in a width direction of the airbag 20 to thereby allow the front lid 14F to be pulled toward both sides in a width direction of the front lid 14F by the tethers 40, when the head H and the upper body of the passenger's seat occupant PS, inclined to the front, have entered the airbag 20 from the rear.

In an example embodiment described above, the pair of right and left tethers 40 may couple the front lid 14F and the airbag 20 together. The number of tethers 40 that couple the front lid 14F and the airbag 20 together is optional and may be set to any number. In some embodiments, the number of tethers 40 may be three, and the additional tether 40 may couple the middle part in the right-left direction of the tip of the front lid 14F and the upper end of the airbag 20.

In an example embodiment described above, the front end 40A of the tether 40 may be coupled to the corner of the tip of the front lid 14F. In some embodiments, the front end 40A of the tether 40 may be coupled to the middle part in the up-down direction of the stood front lid 14F.

Figure 7:
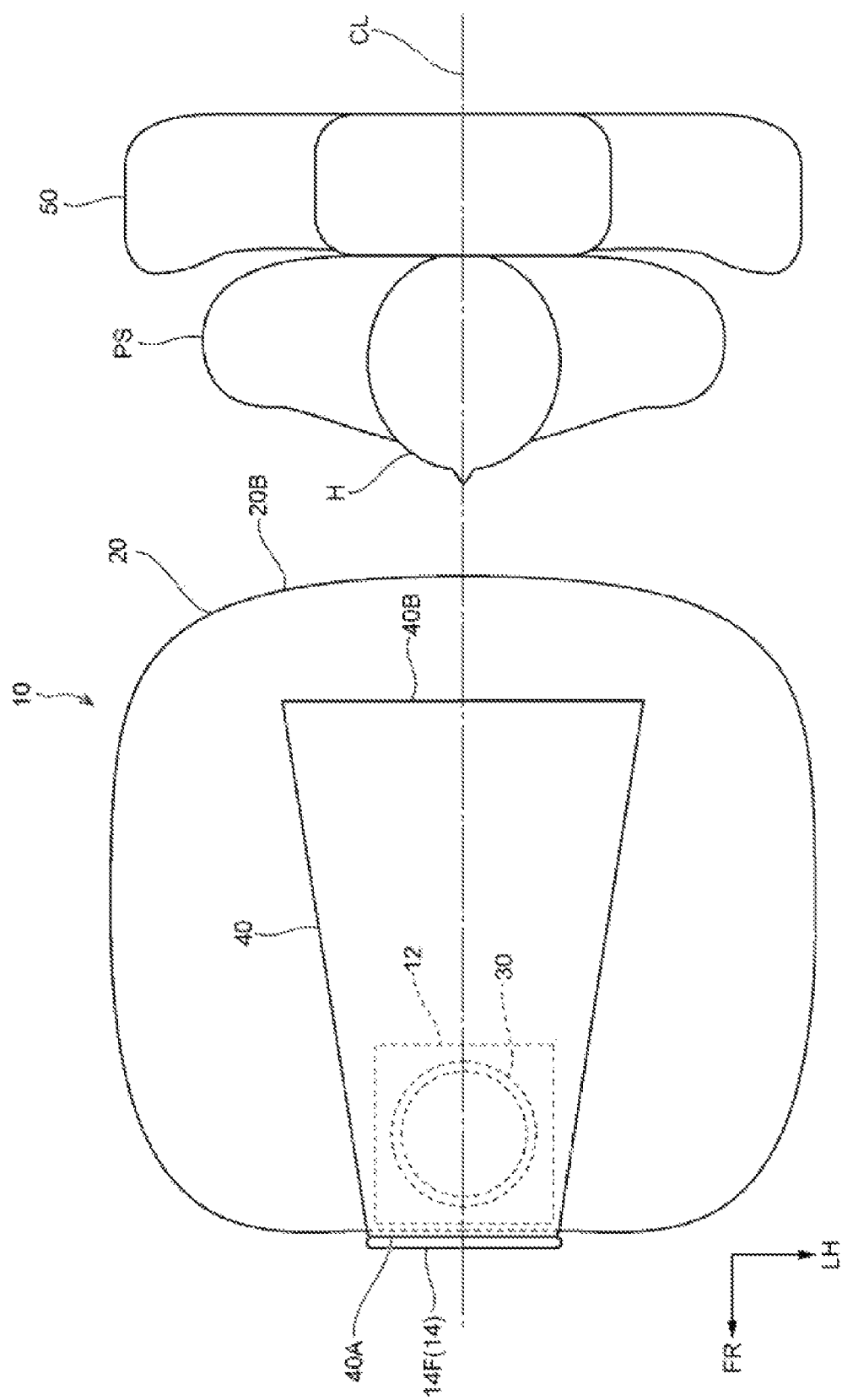
FIG. 7 is a plan diagram illustrating another modification example of the tether of the vehicle airbag apparatus illustrated in FIG. 2.

In an example embodiment described above, the tether 40 may be the string-shaped member having the flexibility and configured not to expand or contract. However, the characteristics of the tether 40 are not limited thereto. In some embodiments, the tether 40 may be a band-shaped member having flexibility and configured to expand or contract. In this example, referring to FIG. 7, a width of the rear end 40B of the tether 40 may be set to be greater than a width of the front end 40A of the tether 40 in a manner corresponding to a width of the airbag 20. Further in this example, although unillustrated, the rear end part of the tether 40 may be branched in the width direction to couple the rear ends 40B of the respective tethers 40 to the airbag 20.

In an example embodiment described above, the lid 14 may include the front lid 14F and the rear lid 14R. In some embodiments, the lid 14 may include only the front lid 14F. In this example, the lid 14 may be configured to be ruptured and opened only toward the front.

As used herein, the term "collision" may be used interchangeably with the term "contact". Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A vehicle airbag apparatus to be applied to a vehicle, the vehicle airbag apparatus comprising:
    an airbag configured to be disposed on a back side of an instrument panel of the vehicle, the airbag being configured to be expanded and developed between the instrument panel and a windshield glass of the vehicle in response to a supply of a gas such that the airbag is disposed on a front side in the vehicle and in front of an occupant of the vehicle;
    a front lid configured to be disposed on the instrument panel, the front lid being configured to be ruptured and opened by the expanded and developed airbag such that the front lid stands on the front side in the vehicle and at a front end of the airbag; and
    a tether that is disposed on an outer part of the airbag and couples the front lid and the airbag, the tether being configured to be elongated in a front-rear direction of the vehicle in a state where the airbag is expanded and developed,
    wherein the tether includes:
        a front end directly fixed to the front lid; and
        a rear end directly fixed to the air bag, and
    wherein, in the state where the airbag is expanded and developed, the rear end of the tether is disposed at an upper side and a rear side in the vehicle as compared with the front end of the tether.

2. The vehicle airbag apparatus according to claim 1, wherein the tether is configured to be elongated such that the tether is interposed between the airbag and the windshield glass.

3. The vehicle airbag apparatus according to claim 1, wherein the front end of the tether is direction fixed to a tip of the front lid.

4. The vehicle airbag apparatus according to claim 2, wherein the front end of the tether is direction fixed to a tip of the front lid.

5. The vehicle airbag apparatus according to claim 1, wherein the tether comprises a plurality of string-shaped tethers, and
    wherein the tethers couple the airbag and the front lid.

6. The vehicle airbag apparatus according to claim 2, wherein the tether comprises a plurality of string-shaped tethers, and
    wherein the tethers couple the airbag and the front lid.

7. The vehicle airbag apparatus according to claim 3, wherein the tether comprises a plurality of string-shaped tethers, and
    wherein the tethers couple the airbag and the front lid.

8. The vehicle airbag apparatus according to claim 4, wherein the tether comprises a plurality of string-shaped tethers, and wherein the tethers couple the airbag and the front lid.

9. The vehicle airbag apparatus according to claim 1, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

10. The vehicle airbag apparatus according to claim 2, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

11. The vehicle airbag apparatus according to claim 3, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

12. The vehicle airbag apparatus according to claim 4, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

13. The vehicle airbag apparatus according to claim 5, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

14. The vehicle airbag apparatus according to claim 6, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

15. The vehicle airbag apparatus according to claim 7, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

16. The vehicle airbag apparatus according to claim 8, further comprising a rear lid configured to be disposed, on the instrument panel, rearward of the front lid in the front-rear direction of the vehicle, wherein the rear lid is configured to be ruptured and opened toward the rear side in the vehicle by the expanded and developed airbag and to be interposed between the instrument panel and the airbag.

17. The vehicle airbag apparatus according to claim 1, wherein the tether extends obliquely upward along the airbag towards the rear side in the vehicle such that the rear end of the tether is disposed at the upper side of a head of the occupant of the vehicle.

18. The vehicle airbag apparatus according to claim 1, wherein the rear end of the tether is fixed to the airbag at an upper end part of the airbag.

19. The vehicle airbag apparatus according to claim 1, wherein, in the state where the airbag is expanded and developed, the rear end of the tether is disposed at the rear side in the vehicle as compared with an upper end of the airbag.

20. The vehicle airbag apparatus according to claim 1, wherein the front end of the tether is fixed to an inner surface of the front rid, the inner surface of the front rid facing to the rear side in the vehicle in the state where the airbag is expanded and developed.

* * * * *